United States Patent [19]
Warren et al.

[11] 3,891,509
[45] June 24, 1975

[54] $CO_2$ GENERATING TABLET FOR CULTURE DEVICES

[75] Inventors: Don R. Warren; Louis W. Busse, both of Madison, Wis.

[73] Assignee: Clinical Convenience Products, Inc., Madison, Wis.

[22] Filed: May 6, 1974

[21] Appl. No.: 466,985

[52] U.S. Cl. .................. 195/109; 195/99; 252/7
[51] Int. Cl. ............................................. C12b 1/00
[58] Field of Search .......... 195/109, 99, 127; 252/7

[56] References Cited
UNITED STATES PATENTS
3,098,016   7/1963   Cooper et al. ................ 195/109

*Primary Examiner*—Alvin E. Tanenholtz
*Attorney, Agent, or Firm*—Howard W. Bremer

[57] ABSTRACT

A tablet suitable for insertion into loosely capped culture devices to produce increased carbon dioxide tension therein comprising in combination a carbon dioxide couple, polyvinylpyrollidone, and a long chain fatty acid ester of a polyhydroxy alcohol.

10 Claims, No Drawings

$CO_2$ GENERATING TABLET FOR CULTURE DEVICES

This invention relates to an improvement in methods for bacteria quantitation and differentiation employing culturing devices.

More specifically, this invention relates to compositions in tablet form for insertion into culturing devices to generate and maintain increased carbon dioxide tension in such devices.

The cultivation of many bacteria for diagnostic purposes is adversely affected by the presence of $O_2$ in the ambient atmosphere in which the culture is growing. This problem exists not only in the laboratory but is of particular importance where culture sample for the assessment of an existing or potential disease state are taken in the field or clinic and the culture medium with the inoculum is then transported to another site for evaluation.

Various methods have been used to produce and maintain increased $CO_2$ tension (reduced oxygen tension) in culture devices. A review of such methods can be found in U.S. Pat. No. 3,451,894 and 3,616,263 the disclosures of which patents are specifically directed to caps for culture tubes which contain a rupturable capsule of $CO_2$.

The present invention provides a convenient way in which increased $CO_2$ tension in culture devices can be generated and maintained and finds particular application with loosely capped culture devices associated with such other devices as the bi-media dip plate of application for U.S. Pat. Ser. No. 128,905, filed Mar. 29, 1971, and the disposable culture device described and claimed in U.S. Pat. No. 3,563,859, issued Feb. 16, 1971.

It has now been found that the ends of this invention, namely, the generation and maintenance of increased $CO_2$ tension in culture devices, can be achieved by providing a $CO_2$ generating tablet for insertion into such devices. Such tablet, to be effective for the desired purposes must have highly specific characteristics. For example, it cannot be the type of tablet well known in the art which, upon insertion into water, will, through immediate and rapid effervescence, form a carbonated beverage of medical aid. Rather, it must provide a relatively slow release of $CO_2$ over a period of time which will permit adequate incubation and growth of the inoculum in the culture medium for evaluation purposes.

In addition, in order to function satisfactorily for its intended purposes the tablet of the this invention must be characterized by some hygroscopicity. This characteristic permits the carbon dioxide couple of the tablet to be activated without the addition of water to the culture device. The addition of water to the culture device is to be avoided because of the danger of reinoculating the culture media, or, where bi-media dip plates are used for testing purpose, of dissolving some of the differentiating water soluble dyes or nutrient biochemicals present in one media and thereby permitting obscuring and incorrect interpretation of the test results.

It is also important that the tablet not disintegrate within the culture device as it releases the $CO_2$ through action of the $CO_2$ couple and thereby risk chemical contamination of the culture media by the tablet residue. Instead, the tablet must remain in an intact gelatinous mass which will cling to the interior of the culture device as the $CO_2$ couple interacts. Thus, all of the tablet residue will be retained in a confined area and the possibility of media contamination is minimized.

The tablet of this invention, and which displays the foregoing characteristics, comprises, in combination, a carbon dioxide couple, polyvinylpyrrolidone and a long chain fatty acid ester of a polyhydroxy alcohol.

The carbon dioxide couple can be any of those well known in the art provided only that the acid constituent and the products of the couple reaction are non-toxic, i.e. are not anti-bacterial in nature. The acid constituent can be selected from water-soluble acids such as citric, tartaric, ascorbic, succinic, malic and fumaric acids and, as the carbon dioxide source, water-soluble carbonates, such as sodium bicarbonate, sodium carbonate, sodium sesquicarbonate and potassium carbonate. The preferred carbon dioxide couple for purposes of this invention is citric acid and sodium bicarbonate. These constituents can be used in stoichiometric relationship in the carbon dioxide couple as is well understood in the art and the couple, with its components in such relationship, can comprise from about 25% to about 65% by weight of the tablet. For generation of the maximum possible amount of $CO_2$ the ratio of the citric acid to sodium bicarbonate in the couple should be 1:1.25.

The polyvinylpyrrolidone (PVP) useful in the tablet of this invention can have a molecular weight in the range from about 30,000–200,000. The particular molecular weight used for a particular tablet formulation can be selected to achieve the desired rate of carbon dioxide release. The higher the molecular weight the slower the release of carbon dioxide from the tablet. The amount of PVP used in the tablet formulation can range from about 30% to about 60% by weight of the tablet. In any event the amount of PVP used in any formulation should be insufficient to prevent the carbon dioxide couple from reacting. The preferred PVP for purposes of this invention has a molecular weight of about 30,000 (PVP K-30 manufactured by GAF Corp.) and constitutes about 45% by weight of the tablet.

The long chain fatty acid esters of polyhydroxy alcohols used in the tablets of this invention are preferably those where the fatty acid chain has from about 14 to about 18 carbon atoms and where the polyhydroxy alcohol is glycerol. Other polyhydroxy alcohols which, when esterified with fatty acids can be used for purposes of this invention are the glycols, e.g. propylene glycol, sorbitol and mannitol. The polyhydroxy alcohols can be mono-, di- or tri-substituted with the fatty acids. The degree of substitution can influence the rate of carbon dioxide release from the tablet, the higher fatty nature of the di- and tri-substituted alcohols tending to slow the release of carbon dioxide. Consequently, this tablet constituent can provide a convenient means to control carbon dioxide release from the tablet. The fatty acid ester of a polyhydroxy alcohol is preferably used in an amount about 10% by weight of the tablet although amounts in the range from about 5% to 15% also find application.

It is to be understood that the tablet size will be governed to a great extent by the amount of carbon dioxide which is to be generated. For a given culture device the cap leak rate can be determined and the release of the carbon dioxide established through tablet formulation so that a $CO_2$ concentration of from about 5% to about 20% can be maintained in the culture device. For applications contemplated with the tablets of this invention, the concentration of $CO_2$ in the culture device should be at least 5%.

A tablet formulation which has been found to be eminently successful in achieving the desired performance characteristics in use outlined above is set forth below, the amounts of ingredients in combination being suitable for the preparation of about 6,000 tablets.

| | |
|---|---|
| Sodium bicarbonate | 450.00 gm. |
| Citric acid | 360.00 gm. |
| Polyvinylpyrollidone | 810.00 gm. |
| Glyceryl monostearate | 180.00 gm. |

In preparing tablets of the above formulation the citric acid is distributed in the polyvinylpyrollidone after which the sodium bicarbonate and glyceryl monostearate are added in sequence. The ingredients are thoroughly mixed together at each step in the dry state, i.e. without addition of water or other solvents. Total mixing time is normally about 10 minutes. After mixing the admixture is run through a tablet press, as is well known in the art, to produce tablets weighing approximately 0.30 grams and which are approximately three-eighths inches in diameter.

A tablet as prepared above when placed in a culture device behaves in the following manner.

The ambient moisture in the culture device reacts with the carbon dioxide couple on and near the surface of the tablet to produce an initial flood of carbon dioxide for approximately three to four hours. This flood of $CO_2$ tends to purge the culture device of some of the air initially present and establish an increased $CO_2$ tension in the device. As the polyvinylpyrrolidone ingredient of the tablet absorbs the moisture present it begins to swell and through such hygroscopic activity and through mechanical blocking resulting from the swelling tends to prevent moisture from reaching the carbon dioxide couple in the interior of the tablet thereby slowing down the $CO_2$ generation. It has been found that the foregoing tablets in the absence of added moisture, i.e. with only the ambient moisture in the culture device, will continue to generate $CO_2$ for about 14 to 20 hours.

The swelling of the polyvinylpyrrolidone, as pointed out above, also serves to keep the $CO_2$-releasing tablet in an intact gelatinous mass which clings to the interior wall of the culture device and thereby prevents contamination of the culture media.

The ingredients of the tablet, namely, the carbon dioxide couple, polyvinylpyrollidone and the fatty acid ester of a polyhydric alcohol, can be used in various proportion within the ranges set forth above depending upon the particular application for which the tablet is intended. For example, if a more rapid evaluation of copious amounts of carbon dioxide is desired the following tablet formulation can be used for a 6,000 tablet production:

| | |
|---|---|
| Sodium bicarbonate | 650 gms. |
| Citric acid | 520 gms. |
| Polyvinylpyrollidone | 540 gms. |
| Glyceryl monostearate | 90 gms. |

If, on the other hand, a slow release of carbon dioxide is desired the following tablet formulation can be used for making approximately 6,000 tablets:

| | |
|---|---|
| Sodium bicarbonate | 250 gms. |
| Citric acid | 200 gms. |
| Polyvinylpyrollidone | 1080 gms. |
| Glyceryl monostearate | 270 gms. |

Having thus described the invention what is claimed is:

1. A tablet suitable for insertion into culture tubes to generate and release carbon dioxide therein which comprises about 25% to about 65% by weight of a carbon dioxide couple, about 30% to about 60% by weight of polyvinylpyrollidone and about 5% to about 15% by weight of a long chain fatty acid ester of polyhydroxy alcohol.

2. A tablet according to claim 1 wherein the carbon dioxide couple comprises a non-toxic acid and a carbonate.

3. A tablet according to claim 2 wherein the carbon dioxide couple comprises sodium bicarbonate and citric acid.

4. A tablet according to claim 1 wherein the fatty acid chain of the fatty acid ester of the polyhydroxy alcohol contains from about 14 to 18 carbon atoms.

5. A tablet according to claim 4 wherein the fatty acid ester of the polyhydroxy alcohol is glyceryl monostearate.

6. A tablet suitable for producing increased carbon dioxide tension inside a culture tube which comprises about 25% to about 65% by weight of a carbon dioxide couple consisting of sodium bicarbonate and citric acid, about 30% to about 60% by weight of polyvinylpyrollidone and about 5% to about 15% by weight of glyceryl monostearate.

7. A tablet according to claim 6 wherein the ratio of citric acid to sodium bicarbonate in the carbon dioxide couple is 1:1.25.

8. A tablet according to claim 7 wherein the polyvinylpyrollidone and the carbon dioxide couple are present in equal amount by weight.

9. A tablet according to claim 8 wherein the carbon dioxide couple is present in an amount of 45% by weight, polyvinylpyrollidone 45% by weight and glyceryl monostearate 10% by weight.

10. A method for generating and maintaining increased carbon dioxide tension in loosely capped culture vials utilizing an independent culture media support, which comprises inserting into such culture vials a tablet comprising about 25% to about 65% by weight of a carbon dioxide couple, about 30% to about 60% by weight of polyvinylpyrollidone and about 5% to about 15% by weight of a long chain fatty acid ester of a polyhydroxy alcohol.

* * * * *